United States Patent [19]

Blevins et al.

[11] Patent Number: 5,304,611
[45] Date of Patent: Apr. 19, 1994

[54] COPOLYMERS OF VINYL DIOXOLANES AND IMIDIZED DERIVATIVES OF MALEIC ANHYDRIDE

[75] Inventors: Richard W. Blevins, Rochester; S. Richard Turner, Pittsford, both of N.Y.

[73] Assignee: Eastman Kodak Company, Rochester, N.Y.

[21] Appl. No.: 998,304

[22] Filed: Dec. 30, 1992

[51] Int. Cl.$^5$ ............................................. C08F 8/32
[52] U.S. Cl. ........................... 525/327.2; 525/327.3; 525/378; 525/379; 526/258; 526/270; 526/271
[58] Field of Search ............... 525/327.2; 526/258, 526/270, 271

[56] References Cited

U.S. PATENT DOCUMENTS

| | | | |
|---|---|---|---|
| 4,882,391 | 11/1989 | Brindopke et al. | 525/327.2 |
| 4,937,292 | 6/1990 | Slemon | 525/327.2 |
| 5,013,806 | 5/1991 | Blevins et al. | 526/271 |
| 5,019,635 | 5/1991 | Blevins et al. | 526/271 |
| 5,071,932 | 12/1991 | Blevins et al. | 526/271 |
| 5,077,365 | 12/1991 | Blevins et al. | 526/271 |

FOREIGN PATENT DOCUMENTS 0724032 2/1955 United Kingdom .
1223015 2/1971 United Kingdom .

OTHER PUBLICATIONS

A. Matsumoto, T. Kubota and T. Otsu, Macromolecules, 23, 4508–4513 (1990).
B. M. Culbertson, Encyclopedia of polymer Science and Engineering, vol. 8, 225–294 (1987).
C. Yang and S. Wang, Journal of Polymer Science: Part A: Polymer Chemistry, vol. 27, 15–29 (1989).

*Primary Examiner*—Bernard Lipman
*Attorney, Agent, or Firm*—J. Frederick Thomsen

[57] ABSTRACT

Copolymers are produced when a 4-vinyl-1,3 dioxolane monomer is copolymerized with an imidized maleic anhydride (for example, maleimide) monomer in the presence of a free radical initiator. Alternatively, a maleamic acid or maleimide functionally may be introduced into a copolymer containing a 4-vinyl-1,3 dioxolane and maleic anhydride by introducing a primary amine into the reaction mixture. Also, the dioxolane reactant may be introduced into the polymer by reacting 3,4-epoxy-1-butene in a ketone reaction solvent. The structure and composition of the product copolymer are controlled by both the sequence and conditions of the reaction. Products of the present invention can be cast as clear films and can also be used as reactive polymers.

7 Claims, No Drawings

COPOLYMERS OF VINYL DIOXOLANES AND IMIDIZED DERIVATIVES OF MALEIC ANHYDRIDE

FIELD OF THE INVENTION

This invention relates to copolymers and to processes for their information.

BACKGROUND OF THE INVENTION

U.S. Pat. Nos. 5,013,806; 5,071,932; 5,077,365; and 5,071,932 (issued to Blevins and Turner in 1991) disclose copolymers of 4-vinyl-1,3-dioxolane with maleic anhydrides. Other than the compounds and processes described in these commonly-owned patents, no other known references discloses copolymers of a 4-vinyl-1,3-dioxolane with maleic anhydride or its derivatives.

It is known that polymers containing maleic anhydride may be imidized to provide maleamic acids and that various chemical means are available to facilitate the ring closure of maleamic acids to form maleimides. However, we are aware of no references involving the polymerization of imidized derivatives of maleic anhydride with 4-vinyl-1,3-dioxolane.

While the copolymers of Blevins and Turner, supra, are useful, it would be desirable to have copolymers with improved properties such as greater resistance to moisture and hydrolysis.

SUMMARY OF THE INVENTION

The present invention provides a method of making novel copolymers from (i) a 4-vinyl-1,3-dioxolane reactant monomer, and (ii) an imidized maleic anhydride reactant. The invention also provides the novel copolymers derived thereby.

More specifically, the invention is a process for the preparation of a copolymer, comprising:

(A) contacting (i) a dioxolane reactant having the formula:

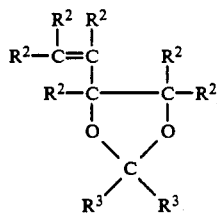

Formula I wherein
each $R^2$ independently represents hydrogen or alkyl having 1 to 4 carbon atoms;
each $R^3$ independently represents hydrogen, alkyl, or aryl having up to about 10 carbon atoms or when taken together represent a cyclic alkylene or arylene group having up to 20 carbon atoms; with (ii) a maleic anhydride reactant having up to 12 carbon atoms;
said contact being in the presence of a free radical initiator, at a temperature within the range of from $-10°$ C. to about $180°$ C.; and (B) contacting the product of step (A) with a primary amine.

The process of the present invention provides several advantages. For example, the process can produce polymers at mild reaction temperatures and pressures thereby avoiding high energy consumption. Further, the process can produce polymers which are soluble in organic solvents, alcohols and water and, hence, need not be melted prior to use as coating materials. The convenience of using water as a solvent also has environmental and regulatory benefits. Additionally, the process of the present invention avoids the more rigorous requirements of anionic polymerization procedures.

The product of the method described above is a copolymer having repeating units of the formula:

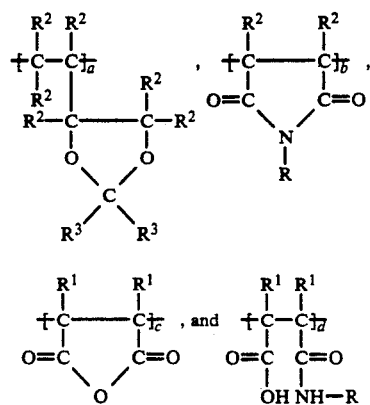

wherein:

R represents hydrogen, alkyl, aryl, substituted aryl, or an alicyclic hydrocarbon having from 1 to about 20 carbon atoms;

each $R^1$ independently represents hydrogen, chlorine, bromine, fluorine, cyano or a lower primary or secondary alkyl of 1 to 4 carbon atoms;

each $R^2$ independently represents hydrogen or alkyl having 1 to 4 carbon atoms;

each $R^3$ independently represents hydrogen, alkyl, or aryl having up to about 10 carbon atoms or when taken together represent a cyclic alkyl or arylene group having up to 20 carbon atoms; and the mole ratio of a:(b+c+d) is approximately equal to 1; b=0 to 50; c=0 to 49; and d=0 to 50 mole percent; provided that both b and d cannot both simultaneously be equal to 0 mole percent.

Preferably, a is equal to about 10 to about 40 mole percent and b is equal to about 60 to about 90 mole percent of the entire copolymer. Preferably R is alkyl from 1 to 4 carbons, benzyl or cyclohexyl, $R^1$ is hydrogen or chlorine, $R^2$ is hydrogen, and $R^3$ is alkyl with 1 to 10 carbon atoms or cyclohexyl.

The monomers of Formula I (4-vinyl-1,3-dioxolanes) used as reactants in the present invention can be prepared by reacting a ketone or aldehyde with 3,4-epoxy-1-butene or a substituted derivative thereof. For the purposes of the present invention, the dioxolane can be employed in the reaction mixture in which it is produced (in situ), or it may be recovered and subsequently used in the process of the invention. Methods of preparing the dioxolanes of the invention are fully described in commonly owned U.S. Pat. No. 5,019,635 (issued to Blevins and Turner, May 28, 1991), the entire contents of which are hereby incorporated by reference.

The process of the present invention during which the 4-vinyl-1,3-dioxolane reactant is formed in situ comprises:

(A) heating a ketone or aldehyde solution of (i) maleic anhydride and (ii) 3,4-epoxy-butene;

said process being conducted in the presence of a free radical initiator, at a temperature within the range of from −10° C. to about 180° C.; and (B) contacting the product of (A) with a primary amine.

The product of this method is a copolymer having repeating units of the formula:

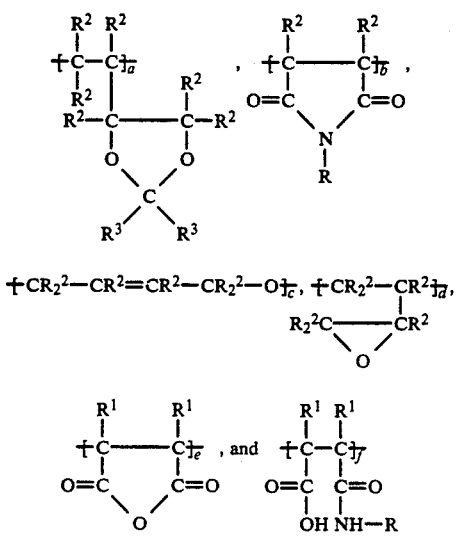

wherein:

R represents hydrogen, alkyl, aryl, substituted aryl, or an alicyclic hydrocarbon having from 1 to about 20 carbon atoms;

each $R^1$ independently represents hydrogen, chlorine, bromine, fluorine, cyano or a lower primary or secondary alkyl of 1-4 carbon atoms;

each $R^2$ independently represents hydrogen or alkyl having 1 to 4 carbon atoms;

each $R^3$ independently represents hydrogen or alkyl, or aryl having up to about 10 carbon atoms or when taken together represent a cyclic alkyl or arylene group having up to 20 carbon atoms; and the mole ratio of (b+c+d):(a+e+f) is approximately equal to 1; c can be 0 to 49 mole percent; b and d taken independently can be 0 to 50 mole percent of the entire polymer provided that both b and d cannot simultaneously be zero.

Preferably, R is alkyl from 1 to 4 carbons, (e.g. methyl, ethyl, t-butyl) benzyl or cyclohexyl, $R^1$ is hydrogen or chlorine, and $R^2$ is hydrogen. Preferably, (a+b) is equal to about 50 mole percent and (c+d+e) is equal to about 50 mole percent of the entire polymer, provided that both b and d cannot simultaneously be zero.

The copolymers of the invention are considerably more resistant to moisture and hydrolysis than are the copolymers reported by Blevins and Turner, *supra*. Accordingly, such copolymers represent new compositions of matter and provide significant advance over the known art.

These results were unexpected; first, because 3,4-epoxy-1-butene is relatively unknown and it was uncertain how it would react in a polymerization process; and second, because some reactants in the copolymer (for example, maleimide) are known to homopolymerize very readily, and so it was surprising that the useful copolymers of the invention were obtained.

The products of the invention are useful alone or as chemical intermediates. They may be incorporated into formulations as binders, dispersing agents, compatibilizers and the like. The copolymers are resinous materials which are valuable for use in plastics, coatings, laminating, adhesives, paper and cloth treatments and other arts. The products of the invention may also be cast as films. Some modifications of the invention may be used as reactive polymers or crosslinking agents.

DETAILS OF THE INVENTION

The process of the invention involves contacting, as reactants, (1) at least one reactant of Formula I:

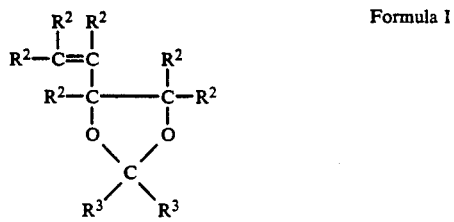

Formula I wherein:

each $R^2$ independently represents hydrogen or alkyl having 1 to 4 carbon atoms;

each $R^3$ independently represents hydrogen or alkyl, or aryl having up to about 10 carbon atoms or when taken together represent a cyclic alkyl or arylene group having up to 20 carbon atoms;

said contact being in the presence of a free radical initiator, at a temperature within the range of from −10° C. to about 180° C.; and (2) and at least one reactant of Formula II:

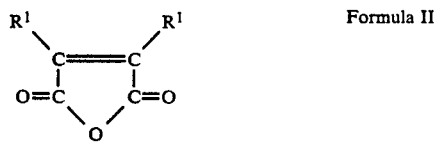

Formula II wherein $R^1$ is as defined above.

The copolymer resulting from the polymerization of Formula I and Formula II is then reacted with a primary amine to produce a copolymer product having repeating units of Formula IV:

Formula IV wherein $R^1$ is as described above.

Optionally, units of Formula IV may be cyclized chemically (for example, by using acetic anhydride or pyridine) or thermally to produce units within the copolymer having the Formula III:

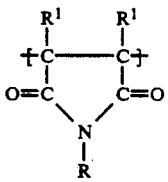

Formula III wherein R and R¹ are as described above.

As described above, Formula I is first polymerized with Formula II and subsequently an imide functionality is introduced by the addition of an appropriate primary amine into the reaction mixture. Alternatively, the imide functionality can be added onto a preformed copolymer wherein the maleic anhydride—3,4-epoxy-1-butene copolymer is recovered from the mixture and later redissolved in an appropriate solvent such as 2-butanone, tetrahydrofuran, or cyclohexanone. The imide functionality is subsequently formed by amine addition and optionally the amine may subsequently be cyclized either chemically or thermally as is well known in the art.

A skilled practitioner will recognize that the anhydride of Formula II is easily hydrolyzed and thus, if water is introduced into the system containing the polymer (for example, during the reaction process), the copolymer products of the invention may exist in hydrolyzed form (Formula V).

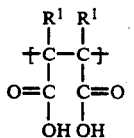

Formula V wherein R¹ is as defined above.

Exemplary compounds of Formula I include 2-methyl-4-vinyl-1,3-dioxolane; 2-ethyl-4-vinyl-1,3-dioxolane; 2-propyl-4-vinyl-1,3-dioxolane; 2-butyl-4-vinyl-1,3-dioxolane; 2-hexyl-4-vinyl-1,3-dioxolane; 2-cyclopentyl-4-vinyl-1,3-dioxolane; 2-cyclohexyl-4-vinyl-1,3-dioxolane; 2-phenyl-4-vinyl-1,3-dioxolane; 2,2-dimethyl-4-vinyl-1,3-dioxolane; 2-ethyl-2-methyl-4-vinyl-1,3-dioxolane; 2,2-diethyl-4-vinyl-1,3-dioxolane; 2-methyl-2-propyl-4-vinyl-1,3-dioxolane; 2,2-dipropyl-4-vinyl-1,3-dioxolane; 2-(t-butyl)-2-methyl-4-vinyl-1,3-dioxolane; 2-ethyl-2-butyl-4-vinyl-1,3-dioxolane; 2-methyl-2-pentyl-4-vinyl-1,3-dioxolane; 2-methyl-2-(2-methyl)-propyl-4-vinyl-1,3-dioxolane; 2-methyl-2-(3-methyl)butyl-4-vinyl-1,3-dioxolane; 2-cyclohexyl-4-vinyl-1,3-dioxolane; 2-(2-methylcyclohexyl)-4-vinyl-1,3-dioxolane; 2-methyl-2-(3-methyl)butyl-4-vinyl-1,3-dioxolane; 2-cyclohexyl-4-vinyl-1,3-dioxolane; 2-(2-methylcyclohexyl)-4-vinyl-1,3-dioxolane; 2-(4-methylcyclohexyl)-4-vinyl-1,3-dioxolane; 2-cyclopentyl-4-vinyl-1,3-dioxolane; 2-methyl-2-phenyl-4-vinyl-1,3-dioxolane; 2,2-diphenyl-4-vinyl-1,3-dioxolane.

Exemplary compounds of Formula III include N-methylmaleimide, N-ethylmaleimide, N-propylmaleimide, N-isopropylmaleimide, N-butylmaleimide, N-sec-butyl-maleimide, N-t-butylmaleimide, N-pentylmaleimide, N-decylmaleimide, N-dodecylmaleimide, N-cyclohexyl-maleimide, N-phenylmaleimide, N-benzylmaleimide, N-(4-methylphenyl)maleimide, N-(3-methylphenyl)maleimide, N-(2-methylphenyl)maleimide, N-(3,5-dimethylphenyl)maleimide, N-(4-iodophenyl)maleimide, N-(4-acetoxyphenyl)-maleimide, and N-naphthylmaleimide.

Suitable amines for reacting with the anhydride functionality enchained in the copolymers resulting from step (A) of the method of the invention include: methylamine, ethylamine, propylamine, isopropylamine, butylamine, butylamine, butylamine, pentylamine, decylamine, dodecylamine, octadecylamine, cyclohexylamine, phenylamine, benzylamine, 4-methylphenylamine, 3-methylphenylamine, 2-methylphenyl)amine, 3,5-dimethylphenylmaleamine, 4-iodophenylmaleamine, N-naphthylamine, and 4-acetoxyphenylamine. Amines which are alkyl, aryl, or substituted aryl are preferred.

As explained above, the monomers of Formula I (4-vinyl-1,3-dioxolanes) used as reactants in the present invention can be prepared by reacting a ketone or aldehyde with 3,4-epoxy-1-butene or a substituted derivative thereof. See U.S. Pat. No. 5,019,635 (issued to Blevins and Turner, May 28, 1991).

The 3,4-epoxy-1-butene monomer reactant has the formula:

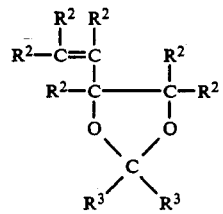

Formula I wherein R² is as defined above.

The enchained 3,4-epoxy-1-butene unit may be in either the 1,2- or 1,4-isomeric form:

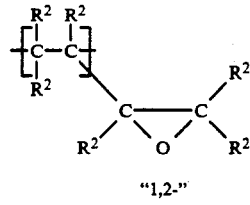

Formula IA

"1,2-"

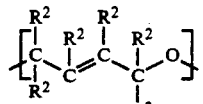

Formula IB

"1,4-"

wherein R² is as defined above.

When preformed vinyl dioxolanes are polymerized with derivatives of maleic anhydride, the polymerization process may be carried out with or without adding a solvent or by conventional emulsion polymerization procedures. However, when vinyl dioxolanes are formed in situ from 3,4-epoxy-1-butene, a ketone or aldehyde is used as a solvent during the reaction. Non-reactive diluent solvent systems include both polar and non-polar chemicals such as toluene, heptane, ethyl ether, tetrahydrofuran, and others. Also, two or more solvents may be combined. The purpose of the solvent system is to permit contact of the monomers and facilitate polymerization. Solvents may also be selected for reasons not directly related to the polymerization step, such as ease of recovery or simplified isolation procedures. Additionally, the solvent may be chosen based on later uses for the product polymer, where the polymer is not isolated but used directly from the reaction mixture. As such, the choice of the solvent is unlimited as long as it does not inhibit, interfere with or otherwise have a deleterious impact on the polymerization, isolation or later applications. The choice of solvent and the monomer concentration may influence and alter the speed and yield of the polymerization process, as well as the molecular weight of the product polymer. Other factors such as economics, ease of recovery and toxicity may influence the choice of diluent solvents.

As mentioned above, it is not necessary to add solvent to the reaction mixture of 3,4-epoxy-1-butene monomer and maleic anhydride. Instead, the 3,4-epoxy-1-butene monomer may be used in such amounts, preferably stoichiometric or in excess of the anhydride, that it acts as both a diluent solvent and a reactant. 3,4-Epoxy-1-butene is liquid at the reaction temperature and may be used to dissolve enough of the anhydride reactant and initiator to permit polymerization to occur. This approach could simplify both the reaction and the recovery procedures.

In all embodiments of the invention, it is not necessary that the reactants be added to the reaction zone in the ratio expected or desired in the copolymer product; an excess of either reactant can be employed. There is no real upper limit on the amount of excess employed; this being defined by such secondary considerations as size of the reaction vessel, cost of the reactants, ease of separation of the starting materials from products, etc. In general, one uses from about 0.5 to about 5.0 moles of one reactant per mole of the other. However, it is to be understood that the composition of the polymer product is relatively insensitive to the ratio of reactants in the feed composition.

The polymerization reaction is initiated by a free radical generating composition. Such initiators may be selected from a wide variety of materials which are known to cause polymerization of ethylenically unsaturated monomers. These materials include, but are not limited to azobisisobutyronitrile (AIBN), peroxides, azides, redox initiators, and similar compounds familiar to those skilled in the art. The amount of initiator employed is not critical. One employs enough initiator to achieve the desired result. Generally speaking, the amount of initiator is from about 0.1 to 10 weight percent of any individual monomer in the reaction mixture. A skilled practitioner will recognize that more or less initiator may be used to obtain polymers of molecular weights somewhat outside the ranges stated in the claims.

If a redox initiator is used, a reaction temperature somewhat below the temperature used with free radical initiation may be desired. Thus, for example, redox initiators can be employed at room temperature or below. Similar processes of polymerization are also described in earlier cited, commonly-owned U.S. Pat. Nos. 5,071,930; 5,071,931, 5,071,932 and 5,013,806, the contents of which are herein incorporated in their entirety.

The temperature of the polymerization reaction may be varied over a wide range including temperatures over the boiling point of any of the reaction monomers or solvents when done under pressure. Several commercial processes for the manufacture of maleic anhydride copolymers, discussed by B.M. Culbertson, *Encyclopedia of Polymer Science and Engineering*, Vol. 9, pp. 225-294 (1987), involve the use of pressure reactions to increase molecular weight. In most cases the polymerization temperature will be within the range of −10 to 180 degrees centigrade, more particularly within the range of 15 to 120 degrees, depending upon the initiator system employed and other influencing factors. For example, most redox initiators are employed at room temperature or below, whereas free-radical initiators require higher temperatures. The reaction is allowed to continue for a time sufficient to allow the copolymer product to form. The process time can be seconds, or up to 48 hours, depending on whether the process is continuous or whether an intermediate is first recovered.

The formulae of the copolymers derived by the method of the invention has already been described above. Generally the copolymer has a number average molecular weight of about 500 to about 250,000. The specific structure of an individual copolymer is determined by the constituent monomeric units and by the degree of imidization and/or cyclization carried out during the process of making it.

For example, units derived from Formula I do not homopolymerize. Similarly, units derived from Formula II do not homopolymerize. Hence, the process of this invention proceeds by an alternating polymerization, and the units derived from each reactant alternate along the polymer chain in a fashion illustrated by

wherein II is maleic anhydride (Formula II) or a unit derived therefrom and I is a unit derived from vinyl dioxolane (Formula I).

Also, when Formula II in the copolymer is imidized (Step (B) in the method of the invention) to provide Formula IV, depending on the degree of imidization carried out, either some or all of Formula II may be imidized to Formula IV. Hence, the product copolymer may contain units of both Formulas II and IV.

Similarly, any fractional amount of Formula IV may optionally be cyclized to provide Formula III (maleimide) and hence, the copolymer product may contain both Formulas III and IV.

When vinyl dioxolane is formed in situ from 3,4-epoxy-1-butene, as described above, the reaction conditions are generally the same as when the preformed diozolane is used except that a ketone or aldehyde solvent is employed. Some units of 3,4-epoxy-1-butene may remain unchanged at the end of the reaction. As shown in Formulae IA and IB, the 3,4-epoxy-1-butene monomer reacts in part through the ring opening polymerization and in part through the vinyl group. Thus, the difunctional 3,4-epoxy-1-butene can contribute at least two chemically distinct groups to the copolymer product. Thus, both isomeric forms of 3,4-epoxy-1-butene may be present in the copolymer product.

The reactant monomers do not homopolymerize. Thus, in the copolymer product, the mole ratio of 3,4-epoxy-1-butene (two isomeric forms) and dioxolane moieties would be approximately equal to the mole ratio of maleic anhydride and it derivatives. Thus, in the above formula of the copolymer, $(a+e+f)=(b+c+d)$.

Representative polymerization processes and the resulting copolymers follow.

EXAMPLES

EXAMPLE 1

In a dry glove box under helium, 2,2-dimethyl-4-vinyl-1,3-dioxolane (0.641 gram, 5 mmol), N-phenyl maleimide (0.866 gram, 5 mmol), azobisisobutyronitrile (AIBN) (0.016 gram, 0.1 mmol) and 1.5 grams of dry 2-butanone were combined in a Claisen bottle with a magnetic stirrer and then sealed. The reaction mixture was heated with stirring in an oil bath at 70° C. for 20 hours. The product polymer rapidly precipitated out of solution and coated the walls of the Claisen bottle during the reaction. The reaction mixture was diluted with 5 grams acetone and precipitated into methanol. The solid product was collected using suction filtration and dried under vacuum at 40° C. for 20 hours. Yield was 0.94 gram, 62% theory. $Mn=5430$, $Mw=12,300$, $Mw/Mn=2.27$. Integration of the phenyl region versus the dimethyl region of the NMR spectrum indicates a 3.2 to 1 ratio of the maleimide to the dioxylane in the product copolymer. The values for combustion analysis were consistent with a 3 to 1 ratio of the maleimide to the dioxolane.

EXAMPLE 2

In a dry glove box under helium, 2-ethyl-2-methyl-4-vinyl-1,3-dioxolane (0.71 gram, 5 mmol), N-(piodophenyl) maleimide (1.50 grams, 5 mmol), AIBN (0.016 gram, 0.1 mmol) and 2.21 grams of dry 2-butanone were combined in a Claisen bottle with a magnetic stirrer and then sealed. The reaction mixture was heated with stirring in an oil bath at 70° C. for 24 hours. The reaction mixture was dissolved with 5 grams dimethyl acetamide and precipitated into ethyl ether. The solid product was collected using suction filtration and dried under vacuum at 40° C. for 20 hours. Yield was 1.02 gram, 46% theory. $Mn=3940$, $Mw=30,300$, $Mw/Mn=7.69$. Integration of the phenyl region versus the methyl region of the NMR spectrum indicates approximately a 3 to 1 ratio of the maleimide to the dioxolane in the product copolymer. Combustion analysis: found $N=4.12$, $C=43.24$, $H=3.05$; calculated for 32 parts maleimide to 10 parts dioxolane $N=4.08$, $C=43.71$, $H=3.04$.

EXAMPLE 3

In a dry glove box under helium, 2-ethyl-2-methyl-4-vinyl-1,3-dioxolane (0.71 gram, 5 mmol), N-methylmaleimide (0.556 grams, 5 mmol), AIBN (0.016 gram, 0.1 mmol) and 3.75 grams of dry THF were combined in a Claisen bottle with a magnetic stirrer and then sealed. The reaction mixture was heated with stirring in an oil bath at 70° C. for 24 hours. The reaction mixture was dissolved with 5 grams dimethylacetamide and precipitated into ethyl ether. The solid product was collected using suction filtration and dried under vacuum at 40° C. for 20 hours. Yield was 0.65 gram, 51% theory. $Mn=1390$, $Mw=2180$, $Mw/Mn=1.75$. NMR and combustion analysis were consistent with an approximate 3 to 1 ratio of the maleimide to the dioxolane in the product copolymer.

EXAMPLE 4

In order to observe the effect of reaction time versus copolymer composition, a polymerization was conducted where samples were isolated at timed intervals. In a dry glove box under helium, 2,2-dimethyl-4-vinyl-1,3-dioxolane (4.101 gram, 32 mmol), N-phenyl maleimide (5.541 gram, 32 mmol), AIBN (0.106 gram, 0.64 mmol) and 19.2 grams of dry 2-butanone were combined and stirred until homogenous. The mixture was divided into 7 equal portions, placed in Claisen bottles with a magnetic stirrer and then sealed. The reaction mixture was heated with stirring in an oil bath at 70° C. for the given timed intervals. The reaction mixtures were diluted with acetone and precipitated into methanol. The solid product was collected using suction filtration and dried under vacuum at 40° C. for 20 hours.

| TIME | % YIELD | Mw | Ratio of Diox:Maleim. (NMR) |
| --- | --- | --- | --- |
| 20 minutes | 17 | 14,200 | 0.19 |
| 40 minutes | 42 | 12,500 | 0.22 |
| 60 minutes | 39 | 12,800 | 0.23 |
| 90 minutes | 56 | 12,000 | 0.26 |
| 2 hours | 62 | 11,200 | 0.28 |
| 4 hours | 64 | 11,200 | 0.30 |
| 22 hours | 65 | 11,100 | 0.30 |

EXAMPLE 5

In a dry glove box under helium, 2,2-dimethyl-4-vinyl-1,3-dioxolane (2.0 grams, 15.6 mmol), N-phenyl maleimide (0.40 gram, 2.3 mmol) and AIBN (0.02 gram, 0.12 mmol) were combined in a Claisen bottle with a magnetic stirrer and then sealed. The reaction mixture was heated with stirring in an oil bath at 70° C. for 24 hours. The reaction mixture was dissolved with 5 grams dimethylacetamide and precipitated into methanol. The solid product was collected using suction filtration and dried under vacuum at 40° C. for 20 hours. Yield was 0.62 gram, 89% theory for a 1 to 1 polymer. $Mn=6030$, $Mw=9300$, $Mw/Mn=1.54$. Combustion analysis and integration of the NMR spectrum indicate a 0.84 ratio of the dioxolane to the maleimide in the product copolymer.

EXAMPLE 6

In a dry glove box under helium, 2,2-dimethyl-4-vinyl-1,3-dioxolane (1.28 grams, 10 mmol), maleic anhydride (0.74 gram, 7.5 mmol) N-phenyl maleimide (0.43 grams, 2.5 mmol), AIBN ((0.016 gram, 0.1 mmol) and 4.9 grams of dry 2-butanone were combined in a Claisen bottle with a magnetic stirrer and then sealed. The reaction mixture was heated with stirring in an oil bath at 70° C. for 20 hours. The reaction mixture was dissolved with 5 grams dimethylacetamide and precipitated into methanol. The solid product was collected using suction filtration and dried under vacuum at 40° C. for 20 hours. Yield was 1.10 grams, 45% theory. $Mn=3110$, $Mw=5470$, $Mw/Mn=1.76$.

EXAMPLE 7

In a dry glove box under helium, 2,2-dimethyl-4-vinyl-1,3-dioxolane (0.65 grams, 6.7 mmol), maleic anhydride (0.85 grams, 6.7 mmol), AIBN ((0.011 gram, 0.07 mmol) and 3 grams of dry 2-butanone were combined in a Claisen bottle, fitted with a magnetic stirrer and sealed. The reaction mixture was heated and precipitated into a heptane/ethyl ether (2:1) mixture. The solid product was collected using suction filtration and dried under vacuum at 40° C. for 20 hours. Yield was 0.51 grams of a maleic anhydride/dioxolane copolymer 33% theory. $Mn=2620$, $Mw=4390$, $Mw/Mn=1.68$.

EXAMPLE 8

The amidation of a maleic anhydride/dioxolane copolymer of Example 7 was accomplished as follows. The procedure described in Example 7 was repeated, but prior to precipitation 1.2 grams (13 mmols) of distilled aniline was added and the sealed vial was heated at 45° C. for 30 minutes. The reaction mixture was diluted with 5 grams acetone and precipitated into a heptane/ethyl ether (2:1) mixture. The solid product was collected using suction filtration and dried under vacuum at 40° C. for 20 hours. Yield was 1.40 grams of a maleamic acid/dioxolane copolymer 64% theory. $Mn=2660$, $Mw=4640$, $Mw/Mn=1.74$.

EXAMPLE 9

The maleamic acid copolymer of Example 8 was cyclized as follows. The procedure described in Example 8 was repeated, but prior to precipitation pyridine (2 grams, 25 mmol) was added, the solution stirred for 15 minutes, followed by the addition of 3 grams (29 mmol) of acetic anhydride. The solution was heated to 50° C. and stirred for 1 hour. The reaction mixture was then diluted with 5 grams acetone and precipitated into a heptane/ethyl ether (2:1) mixture. The solid product was collected using suction filtration and dried under vacuum at 40° C. for 20 hours. Yield was 0.54 grams of a maleamic acid/dioxolane copolymer 27% theory. $Mn=2900$, $Mw=5420$, $Mw/Mn=1.87$. The NMR spectrum indicates that the phenyl group has been incorporated in an approximately 1 to 1 ratio with the dioxolane group. The NMR spectrum is similar to the spectrum of a copolymer obtained by polymerizing a preformed n-phenyl maleimide monomer with a 2,2-dimethyl-4-vinyl-1,3-dioxolane monomer.

EXAMPLE 10

The amidation of a dried maleic anhydride/dioxolane copolymer as made in Example 7 was accomplished as follows. A 0.40 gram portion of the dry copolymer was dissolved in 3.5 grams of dry 2-butanone, and 1.2 grams (13 mmols) of distilled aniline was added. The reaction mixture was heated at 45° C. for 30 minutes. The reaction mixture was then diluted with 4 grams acetone and precipitated into a heptane/ethyl ether (2:1) mixture. The solid product was collected using suction filtration and dried under vacuum at 40° C. for 20 hours. Yield was 0.47 grams of a maleamic acid/dioxolane copolymer 81% theory. $Mn=2660$, $Mw=4330$, $Mw/Mn=1.63$.

EXAMPLE 11

The imidization of a dried maleic anhydride/dioxolane copolymer as made in Example 7 was accomplished as follows. A 0.30 gram portion of the dried maleic anhydride/dioxolane copolymer was dissolved in 3.0 grams of dry 2-butanone, and 1.2 grams (13 mmols) of distilled aniline was added. The reaction mixture was heated at 45° C. for 30 minutes. Pyridine (1 gram, 13 mmol) was added, the solution stirred for 15 minutes, followed by the addition of 1.5 grams (15 mmol) of acetic anhydride. The solution was heated to 50° C. and stirred for 1 hour. The reaction mixture was then diluted with 5 grams acetone and precipitated into a heptane/ethyl ether (2:1) mixture. The solid product was collected using suction filtration and dried under vacuum at 40° C. for 20 hours. Yield was 0.35 grams of a maleamic/dioxolane copolymer 81% theory. $Mn=2820$, $Mw=4580$, $Mw/Mn=1.62$. The NMR spectrum indicates that the phenyl group had been incorporated in the polymer, but not as much as in Example 9. The NMR spectrum is similar to the spectrum of the copolymer obtained in Example 9 and to the NMR spectrum of a copolymer of a preformed N-phenyl maleimide monomer with a 2,2-dimethyl-4-vinyl-1,3-dioxolane monomer.

EXAMPLE 12

In a dry glove box under helium, 3,4-epoxy-1-butene (0.70 gram, 10 mmol), N-methyl maleimide (1.11 gram, 10 mmol), AIBN ((0.032 gram, 0.2 mmol) and 3.62 grams of dry 2-butanone were combined in a Claisen bottle, with a magnetic stirrer and sealed. The reaction mixture was heated with stirring in an oil bath at 70° C. for 20 hours. The product polymer gradually precipitated out of solution and coated the walls of the Claisen bottle during the reaction. The reaction mixture was diluted with 5 grams THF and precipitated into ethyl ether. The solid product was collected using suction filtration and dried under vacuum at 40° C. for 20 hours. Yield was 1.02 gram, 56% theory. $Mn=1620$, $Mw=2780$, $Mw/Mn=1.72$. NMR indicated both 1,2- and 1,4-propagation of epoxybutene. The methyl group of the maleimide was present.

EXAMPLE 13

In a dry glove box under helium, 3,4-epoxy-1-butene (1.40 gram, 20 mmol), N-phenyl maleimide (1.73 gram, 10 mmol), AIBN ((0.032 gram, 0.2 mmol) and 1.57 grams of dry 2-butanone were combined in a Claisen bottle, with a magnetic stirrer and then sealed. The reaction mixture was heated with stirring in an oil bath at 70° C. for 20 hours. The reaction mixture was diluted with 5 grams acetone and precipitated into methanol. The solid product was collected using suction filtration and dried under vacuum at 40° C. for 20 hours. Yield was 1.23 gram, 39% theory. $Mn=3530$, $Mw=5830$, $Mw/Mn=1.65$. NMR indicated both 1,2- and 1,4-propagation of epoxybutene. Integration of the phenyl group of the maleimide indicates an approximate ratio of 1 to 1 relative to 3,4-epoxy-1-butene derived peaks.

EXAMPLE 14

In a dry glove box under helium, 3,4-epoxy-1-butene (0.56 gram, 8 mmol), maleic anhydride (0.784 gram, 8 mmol), 4.03 grams of anhydrous 2-butanone and AIBN (0.013 gram, 0.08 mmol) were combined in a Claisen bottle with a magnetic stirrer and sealed. The reaction mixture was heated with stirring in an oil bath at 70° C. for 24 hours. The reaction mixture was diluted with 5 grams of 2-butanone and precipitated into ethyl ether. The solid product was collected using suction filtration and dried under vacuum at 50° C. for 20 hours. Yield was 0.32 gram, 24% theory. $Mn=1690$, $Mw=4730$, $Mw/Mn=2.80$. NMR indicated both 1,2- and 1,4-propagation of epoxybutene. The peaks consistent with the incorporation of 2,2-dimethyl-4-vinyl-1,3-dioxolane (formed in situ) are present.

EXAMPLE 15

Example 7 was derivatized as follows. The procedure for Example 7 was repeated and prior to opening the reaction vial, 1 gram (10.7 mmoles) of aniline in 2 grams of 2-butanone were added. The reaction mixture was stirred an additional hour at 70° C. The sample was precipitated and dried as described in Example 7. Yield was 1.50 gram, 71% theory. Mn=845, Mw=2820, Mw/Mn=3.34. NMR indicated both 1,2- and 1,4- propagation of epoxybutene. The peaks for 2,2-dimethyl-4-vinyl-1,3-dioxolane and phenyl groups (from an aniline-derived amide group) are present.

EXAMPLE 16

Example 8 was cyclized as follows. The procedure for Example 8 was repeated and prior precipitation, pyridine (2 grams, 25 mmol) was added. The solution was stirred for 15 minutes, followed by the addition of 3 grams (29 mmol) of acetic anhydride. The solution was heated to 50° C. and stirred for 1 hour. The sample was precipitated and dried as described in Example 7. Yield was 0.97 gram, 46% theory. Mn=876, Mw=2900, Mw/Mn=3.31. NMR indicated both 1,2- and 1,4-propagation of epoxybutene. The peaks for 2,2-dimethyl-4-vinyl-1,3-dioxolane are present.

EXAMPLE 17

The amidation of the dried maleic anhydride/epoxybutene copolymer of Example 7 was accomplished as follows. A 0.23 gram portion of the dry copolymer was dissolved in 2 grams of dry 2-butanone, and 0.5 gram (5.3 mmols) of distilled aniline was added. The reaction mixture was heated at 50° C. for 30 minutes. The reaction mixture precipitated into a heptane/ethyl ether (2:1) mixture. The solid product was collected using suction filtration and dried under vacuum at 40° C. for 20 hours. Yield was 0.25 grams of a maleamic acid/dioxolane copolymer 80% theory. Mn=1800, Mw=3260, Mw/Mn=2.37.

EXAMPLE 18

The maleamic acid copolymer of Example 10 was cyclized as follows. A 0.23 gram portion of the dry copolymer was dissolved in 2 grams of dry 2-butanone, and 0.5 gram (5.3 mmols) of distilled aniline was added. The reaction mixture was heated at 50° C. for 30 minutes. The reaction mixture precipitated into a heptane/ethyl ether (2:1) mixture. Pyridine (1 gram, 13 mmol) was added, the solution stirred for 15 minutes, followed by the addition of 1.5 grams (15 mmol) of acetic anhydride. The solution was heated to 50° C. and stirred for 1 hour. The reaction mixture was diluted with 5 grams acetone and precipitated into a heptane/ethyl ether (2:1) mixture. The solid product was collected using suction filtration and dried under vacuum at 50° C. for 20 hours. Yield was 0.26 grams of a maleimide/dioxolane polymer 83% theory. Mn=1890, Mw=4350, Mw/Mn=2.37. The NMR spectrum indicates less aniline has been incorporated into this polymer than for the polymer of Example 9.

The invention has been described in detail with particular reference to preferred embodiments thereof, but it will be understood that variations and modifications can be effected within the spirit and scope of the invention.

We claim:

1. A copolymer comprising polymerized repeating monomeric units of (a) a 4-vinyl-1,3-dioxolane reactant, and (b) an imidized derivative of maleic anhydride.

2. A copolymer having repeating units of the general formula:

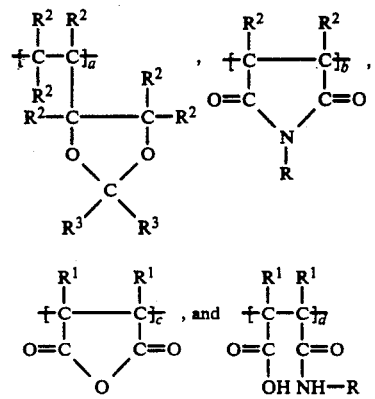

wherein:
R represents hydrogen, alkyl, aryl, substituted aryl, or an alicyclic hydrocarbon having from 1 to about 20 carbon atoms;
each $R^1$ independently represents hydrogen, chlorine, bromine, fluorine, cyano or a lower primary or secondary alkyl of 1 to 4 carbon atoms;
each $R^2$ independently represents hydrogen or alkyl having 1 to 4 carbon atoms;
each $R^3$ independently represents hydrogen, alkyl, or aryl having up to about 10 carbon atoms or when taken together represent a cyclic alkyl or arylene group having up to 20 carbon atoms; and
the mole ratio of a:(b+c+d) is approximately equal to 1; b=0 to 50; c=0 to 49; and d=0 to 50 mole percent of the entire copolymer; provided that both b and d cannot both simultaneously be equal to 0 mole percent.

3. A copolymer according to claim 2 having a number average molecular weight of about 500 to about 250,000.

4. A copolymer according to claim 2 wherein R is alkyl with 1 to 4 carbon atoms, hydrogen or benzyl.

5. A copolymer according to claim 2 wherein $R^1$ is hydrogen or chlorine.

6. A copolymer according to claim 2 wherein $R^2$ is hydrogen.

7. A copolymer according to claim 2 wherein $R^3$ is alkyl with 1 to 10 carbon atoms or cyclohexyl.

* * * * *